United States Patent [19]
Payne

[11] 3,941,874
[45] *Mar. 2, 1976

[54] RECOVERY OF ALUMINUM FLUORIDE

[75] Inventor: Thomas F. Payne, Columbia Falls, Mont.

[73] Assignee: Anaconda Aluminum Co., New York, N.Y.

[ * ] Notice: The portion of the term of this patent subsequent to Oct. 22, 1991, has been disclaimed.

[22] Filed: July 30, 1974

[21] Appl. No.: 493,170

Related U.S. Application Data
[63] Continuation-in-part of Ser. No. 335,494, Feb. 26, 1973, Pat. No. 3,843,498.

[52] U.S. Cl. .............................. 423/489; 423/462
[51] Int. Cl.² .......................................... C01F 7/50
[58] Field of Search ................ 423/489, 472, 462

[56] References Cited
UNITED STATES PATENTS

| | | | |
|---|---|---|---|
| 3,492,086 | 1/1970 | Ve et al. | 423/489 |
| 3,823,078 | 1/1974 | Beeler | 204/67 |
| 3,823,079 | 7/1974 | Beeler | 204/67 |
| 3,843,498 | 10/1974 | Payne | 423/472 X |

OTHER PUBLICATIONS
Chemical Abstracts, Vol. 55, 1961, p. 11776.

*Primary Examiner*—Edward Stern
*Attorney, Agent, or Firm*—Pennie & Edmonds

[57] ABSTRACT

An aqueous solution containing fluorides, for example, hydrofluoric acid, is reacted with commercial grade aluminum oxide comprising predominantly alpha alumina at an elevated temperature to produce a complex aluminum hydroxide fluoride hydrate that precipitates from the solution. The commercial grade aluminum oxide contains an amount of gamma and delta alumina such that the aluminum oxide has a loss of weight on ignition of from about 0.5% to about 2.5%. The resulting aluminum hydroxide fluoride hydrate precipitate is recovered and calcined in a non-oxidizing atmosphere to produce aluminum fluoride suitable for use in the electrolytic production of aluminum.

9 Claims, 1 Drawing Figure

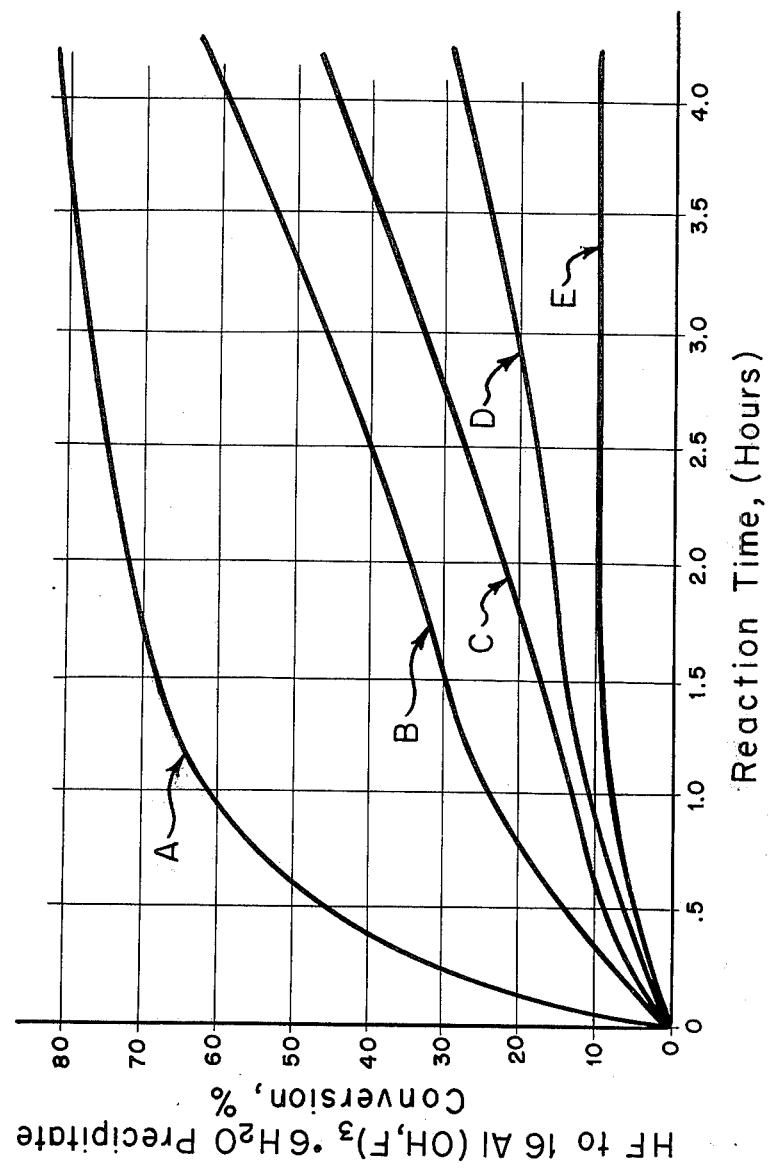

RECOVERY OF ALUMINUM FLUORIDE

RELATED APPLICATION

This application is a continuation-in-part of applicant's copending application Ser. No. 335,494, filed Feb. 26, 1973, now U.S. Pat. No. 3,843,498, issued Oct. 22, 1974.

BACKGROUND OF THE INVENTION

1. Field of the Invention

This invention relates to the treatment of fluoride-containing aqueous solutions to recover the fluoride values thereof in the form of aluminum fluoride.

2. Prior Art

Many industrial processes produce gaseous effluents containing hydrogen fluoride and other fluoride compounds. These gaseous effluents must be treated to remove the fluorides therefrom before the gas is discharged to the atmosphere and also to recover the fluoride values of the gas to avoid uneconomic waste of the fluorides. The most common procedure for recovering the fluoride content of effluent gases is to pass the gas through a scrubbing tower or other apparatus where the gas is scrubbed with water to remove fluorides therefrom and produce an aqueous solution containing these fluorides. The fluoride-containing solution is then, in most cases, treated to recover the fluoride values therefrom.

A number of processes have been proposed which follow this general procedure, the various processes using various scrubbing liquids or reagents to recover the fluoride values in forms suitable for various purposes. Most of these processes, however, require the concentration of fluorides in the scrubbing liquid to be relatively high (in the order of 10% or more HF or equivalent) in order for these processes to be effective and/or economical. Difficulty is encountered when the concentration of fluorides in the effluent gases and hence in the scrubbing liquid is relatively low, as is the case with the fluoride-containing gases evolved from the electrolytic cells in which alumina dissolved in molten cryolite is reduced to metallic aluminum.

My copending application Ser. No. 335,494 describes a process for the recovery of aluminum fluoride from dilute fluoride-containing aqueous solutions in which the fluoride content of the solution is reacted with alumina trihydrate ($Al_2O_3.3H_2O$) at an elevated temperature to produce a complex aluminum hydroxide fluoride hydrate compound in the solution. Aluminum oxide ($Al_2O_3$) is then introduced into the solution to crystallize aluminum hydroxide fluoride hydrate ($16Al(OH,F)_3.6H_2O$) from the solution, the precipitate being recovered and calcined to produce an aluminum fluoride product. The process results in the recovery of a significant portion, and in some cases up to 95%, of the fluoride content of the initial aqueous solution, and it may be used to recover a significant portion of the fluoride content of solutions containing as little as about 0.02% fluoride. In the practice of this process it has been found that equally satisfactory results are obtained when the aluminum oxide is added to the aqueous solution after substantial completion of the reaction between the fluoride content of the solution and the aluminum oxide trihydrate, or when the aluminum oxide is added to the aqueous solution before completion of the reaction between the fluoride content of the solution and the aluminum oxide trihydrate added thereto, or when both the aluminum oxide trihydrate and the aluminum oxide are added to the aqueous solution at the same time so that both the reaction and the precipitation of the reaction product proceed more or less simultaneously.

I have now made the surprising discovery that the fluoride content of dilute aqueous solutions of fluorides can be recovered in the form of the aforementioned aluminum hydroxide fluoride hydrate precipitate ($16Al(OH,F)_3.6H_2O$) when certain "commercial grade" aluminum oxides are employed as the reactant for the fluoride content of the solution, and that acceptable conversion and recovery of the fluoride content of the solution is obtained without prior reaction of the solution with alumina trihydrate $Al_2O_3.3H_2O$) as required in the process of my copending application Ser. No. 335,494. Specifically, I have found that when commercial grade Bayer process aluminum oxide (comprising predominantly alpha alumina) having a loss of weight on ignition (as hereinafter described) of from about 0.5 to about 2.5% is reacted with the fluoride content of a dilute aqueous solution of fluorides under the conditions described herein, up to about 95% of the fluoride content of the solution may be recovered in the form of the aforesaid aluminum hydroxide fluoride hydrate precipitate.

SUMMARY OF THE INVENTION

My improved process for the recovery of aluminum fluoride from a fluoride-containing aqueous solution comprises introduction commercial grade Bayer process aluminum oxide into the solution, said aluminum oxide comprising predominantly alpha alumina admixed with a minor mount of less highly calcined forms of alumina (for example, gamma and delta alumina) such that the aluminum oxide has a loss of weight on ignition of from about 0.5% to about 2.5%. The fluoride content of the solution is reacted with the less highly calcined forms of alumina at an elevated temperature to produce complex aluminum hydroxide fluoride hydrate that precipitates from the solution. The aluminum hydroxide fluoride hydrate precipitate is then recovered from the solution and, if desired, is calcined to produce aluminum fluoride mixed with unreacted aluminum oxide.

The reaction is advantageously carried out at a temperature of between about 140°F and the boiling point of the solution with agitation of the solution for a period of up to about 4 hours. The process results in the recovery of a significant portion, and in some cases up to 95%, of the fluoride content of the initial aqueous solution, and it may be used to recover a significant portion of the fluoride content of solutions containing as little as about 0.02% fluoride.

BRIEF DESCRIPTION OF THE DRAWING

The improved process of the invention will be better understood from the following description thereof in conjunction with the single figure of the accompanying drawing which shows the percentage of the fluoride content of a standard fluoride solution that is converted to aluminum hydroxide fluoride hydrate when reacted for various reaction times (in hours) with various forms of alumina.

DETAILED DESCRIPTION

In the electrolytic production of the metallic aluminum anhydrous aluminum oxide ($Al_2O_3$) dissolved in a molten electrolyte bath consisting predominantly of cryolite ($Na_3AlF_6$) is electrolytically decomposed to produce metallic aluminum at the cathode and to produce oxygen at the anode where it reacts to produce carbon dioxide and carbon monoxide. The molten metallic aluminum collects at the bottom of the electrolytic cell and the carbon dioxide and carbon monoxide evolve from the cell at the carbon anode. The effluent gases usually contain a minor amount of hydrogen fluoride and other volatile fluorides whch must be removed from the gas for environmental reasons and which are advantageously recovered and recycled for economic reasons. The molten metallic aluminum product is periodically removed from the electrolytic cell or pot, and the aluminum content of the molten bath is periodically replenished by the addition thereto of relatively pure commercial grade anhydrous aluminum oxide.

Bauxite, the principal ore of alumina, consists mainly of aluminum oxide, more or less hydrated, and contains various impurities such as iron oxide, aluminum silicate, titanium dioxide and other minerals. Bauxite is treated by the Bayer process to separate the alumina from the various impurities of the ore, the relatively pure hydrated alumina product ($Al_2O_3.3H_2O$) of the Bayer process being recovered by filtration. Bayer process alumina trihydrate comprises about 45% water which includes about 30% fixed water of hydration. The hydrate alumina is converted to anhydrous alumina suitable for use to cell feed material by calcining the alumina in a large rotary kiln, the residence time of the alumina in the kiln being typically about 2 hours and the temperature of the alumina at the hot or discharge end of the kiln being about 1200°C. Properly calcined Bayer process alumina comprises predominantly alpha alumina admixed with a minor amount of less highly calcined forms of alumina and, as noted, is employed as feed material to replenish the aluminum content of the elctrolytic cells or pots. Calcined Bayer process anhydrous alumina is referred to as "commercial grade" alumina in the ensuing description and claims.

When Bayer process alumina trihydrate is heated in the rotary kiln the free water is first evaporated and then the fixed water of hydration is driven off, the trihydrate first being converted to alumina monohydrate and then to various crystalline forms of anhydrous alumina as the material proceeds through the kiln to the discharge end thereof. Theoretically, when the temperature of the alumina reaches about 500° C it is converted first to the gamma crystalline form of anhydrous alumina. When the temperature reaches about 860° C delta alumina is formed. Theta alumina is formed at about 1,060° C. and alpha alumina (the most highly calcined and the most desirable form of alumina) is formed at about 1140° C. Also seen is a more or less minor path where the alumina trihydrate proceeds directly to chi alumina at about 300° C. and kappa alumina at about 800° C. and ultimately alpha alumina at about 1140° C. Theoretically, therefore, the calcined alumina product discharged from the hot end of the kiln at 1200° C. should comprise 100% alpha alumina. In fact, the alpha alumina is admixed with minor amounts of less highly calcined forms of alumina, principally gamma alumina and delta alumina. If the calcined alumina product contains an excessive amount of the less highly calcined forms of alumina, it is unsuitable for use as the feed material for the electrolytic cells. Accordingly, the alumina is analyzed from time to time to ascertain its degree of calcination and its suitability for use in the production of aluminum metal.

One of the tests employed to determine the degree of calcination of Bayer process anhydrous alumina is the loss of weight of the alumina on ignition. In this test procedure a sample of the alumina is first heated at a temperature of 110° C. for 3 hours to evaporate all free moisture and to thoroughly dry the sample. The dry sample is weighed and then is heated to a temperature of 1100° C. for 1 hour and again weighed. The loss in weight of the dry sample is a measure of the degree of completeness of calcination of the alumina being tested and hence is a reliable indication of the amount of lower (i.e., less than completely) calcined forms of alumina originally present in the test sample.

For example, alpha alumina is the highest (i.e., completely) calcined form of alumina, and a sample having 0% loss of weight on ignition (L.O.I.) is completely calcined and therefore would normally comprise 100% alpha alumina. A sample having 1.0% L.O.I. comprises predominantly alpha alumina admixer with a minor amount of less highly calcined forms of alumina, and a sample having 2.0% L.O.I. contains a somewhat higher proportion of less than completely calcined forms of alumina (principally gamma and delta alumina). The smaller the loss of weight on ignition the better the alumina is for use as cell feed material, good quality commercial grade alumina typically having between 0.5% and 1.5% L.O.I. It has been found that alumina having more than about 2.5% L.O.I. is in most cases unsuitable for use as cell feed material. For the reasons hereinafter discussed, commercial grade alumina suitable for use in my new process has a loss of weight on ignition of from about 0.5% to 2.5%. It is to be noted that in a loss of weight on ignition determination, the weight loss experienced is not due to a weight loss in the transition of phase forms, but is due to the completion of calcination of the various hydrates present in incompletely calcined alumina.

As previously mentioned, my copending application Ser. No. 335,494 describes a process from the recovery of aluminum fluoride from dilute fluoride-containing aqueous solutions obtained, for example, by scrubbing the effluent gases from the electrolytic cells of an aluminum pot line with water. In my prior process the fluoride content of the aqueous solution is reacted with alumina trihydrate to produce a complex aluminum hydroxide fluoride hydrate compound in the solution. Aluminum oxide, advantageously in the form of commercial grade alumina, is then introduced into the solution to precipitate crystalline aluminum hydroxide fluoride hydrate ($16Al(OH,F)_3.6H_2O$) from the solution, the precipitate being recovered and calcined to produce an aluminum fluoride product suitable for recycling through the electrolytic cells. In the course of my experimental and developmental work on this process I made the surprising discovery that, under certain circumstances, equally satisfactory recoveries of the fluoride content of the aqueous solutions being treated can be obtained by the addition to the reaction with the solution of certain commercial grade aluminas without the necessity for prior reaction of the solution with alumina trihydrate.

Further investigations based on the aforementioned discovery have established that the lower calcined forms of anhydrous alumina (that is, less highly calcined than alpha alumina) are capable of reacting with the fluoride content of the aqueous solutions being treated in the same manner and with the same result as when the solution is reacted with alumina trihydrate. That is to say, I have found that the fluoride content of the solution is converted to and precipitates as crystalline aluminum hydroxide fluoride hydrate when the solution is reacted with the aforesaid lower calcined forms of alumina just as it does when the solution is reacted with alumina trihydrate. The conversion reaction proceeds somewhat more rapidly when the fluoride is first reacted with alumina trihydrate. However, entirely acceptable reaction rates and recoveries can be obtained when the fluoride content of the solution is reacted with the less highly calcined forms of anhydrous alumina (for example, gamma alumina and delta alumina) as described herein. On the other hand, I found that when the degree of calcination of commercial grade alumina approaches 100% alpha alumina the reaction rates and recoveries obtained are, for all practical purposes, unacceptable.

As previously described, commercial grade anhydrous alumina comprises predominantly alpha alumina admixed with a minor amount of less highly calcined forms of alumina. Not all commercial grade alumina is useful in the practice of my new process. That is to say, I have found that alumina that contains too little of the lower calcined forms of alumina is unacceptable for use in my process, and I have also found that alumina that contains too high a loss of weight on ignition may be unacceptable for the reasons heretofore discussed. As the degree of calcination of commercial grade aluminum can most conveniently be expressed in terms of its loss of weight on ignition, I have determined that the commercial grade alumina suitable for use in the practice of my new process should have a loss of weight on ignition of from 0.5% to 2.5%. Aluminas having less than 0.5% L.O.I. have an insufficient amount of the less highly calcined forms of alumina to be effective in my process, whereas aluminas having more than about 2.5% L.O.I. are unacceptable for the reasons hereinbefore discussed.

Commercial grade alumina having from about 0.5% to about 2.5% L.O.I. contains a small amount of alumina trihydrate, as well as other volatile compounds, which show up as the weight lost on a loss-on-ignition determination. However, even if it is assumed that all of the loss of weight on ignition is due to the dehydration and conversion of alumina trihydrate to anhydrous alumina (which it is not), and therefore that the original commercial grade alumina contains a corresponding amount of alumina trihydrate (which it does not), in the typical case this would amount to only about 10% of the total aluminum ion required to react with the fluoride content of the solution (typically about 0.6%) to produce the alumina hydroxide fluoride hydrate obtained. Accordingly, it is clear that at least about 90% of the aluminum ion required to react with the fluoride content of the solution comes from the lower calcined forms of anhydrous alumina present in the commercial grade alumina employed in the process.

The process of the invention is carried out in essentially the same manner as the process of my copending application Ser. No. 335,494. The fluoride-containing aqueous solution is first advantageously filtered to remove particulate matter therefrom, and the filtered solution is then heated to an elevated temperature within the range of from about 140° F. to the boiling point of the solution. Commercial grade anhydrous alumina having a loss of weight on ignition of from about 0.5% to about 2.5% is added to the solution and is reacted with the fluoride content of the solution to produce aluminum hydroxide fluoride hydrate which crystallizes and precipitates from the solution. The amount of alumina employed may range from less than 1 to about 20 weight portions of alumina for one weight portion of theoretical aluminum fluoride that can be formed from the fluoride present in the solution, and I presently prefer to use a weight ratio of alumina to theoretical aluminum fluoride of between about 1:1 and 5:1, and for example about 3:1. The reaction is carried out at a temperature of from 140° F. to the boiling point of the solution, with agitation, and preferably at a temperature of between about 175° F and 190° F. Precipitation of the aluminum hydroxide fluoride hydrate product begins immediately upon adding the alumina and may take 20 hours to complete, although 3 to 4 hours is usually sufficient and economically advantageous.

The precipitated aluminum hydroxide fluoride hydrate is separated and recovered, advantageously by filtration. The filtered precipitate unavoidally contains all of the unreacted alumina added to the reaction solution, but this is not harmful for most of the intended uses of the ultimate product. Chemical and X-ray diffraction analysis of dry samples of the precipitate demonstrate that the precipitate comprises a mixture of aluminum oxide ($Al_2O_3$) and aluminum hydroxide fluoride hydrate ($16Al(OH,F)_3.6H_2O$). The demonstrated presence of aluminum hydroxide fluoride hydrate in the precipitate indicates that this compound is the principal product of the reaction between the fluoride content of the initial solution and the alumina added thereto.

The precipitated aluminum hydroxide fluoride hydrate product is calcined to drive off the water content and other volatiles present therein. The calcination is advantageously carried out at a temperature of from about 400° to 620° C. The thickness of the bed of the material being calcined should be at least ⅛ inches and preferably thicker. Chemical and X-ray diffraction analysis of the calcined product demonstrate that it comprises essentially a mixture of aluminum fluoride and aluminum oxide that is suitable for use as make-up feed material for the electrolyte of an aluminum electrolytic cell.

The following examples are illustrative but not limitative of the practice of the invention:

EXAMPLE I

A quantity of Bayer process alumina trihydrate (Kaiser H-30) was screened to obtain a plus 150 mesh fraction as the starting material. The starting material was heated in a moist caustic atmosphere at a temperature of 200° C. for 24 hours to drive off all free moisture. The material was then heated at a temperature of 700° C. for another 24 hours and a first portion of the calcined material was removed for test purposes. The remainder of the starting material was then heated to a temperature of 900° C. for 8 more hours and a second portion of the calcined material was removed for testing. The third and final portion of the starting material was then calcined at 1250° C. for 24 hours.

Theoretically, the first portion calcined at 700° C. should be essentially gamma alumina. Analysis of this portion by X-ray diffraction showed this to be the case, although a considerable amount of chi alumina was also identified. The calcined material contained no detectable amount of alumina trihydrate. Theoretically, the second portion of the material calcined at 900° C. should be essentially delta alumina. X-ray diffraction analysis revealed the presence of a major amount of delta alumina together with lesser amounts of gamma and kappa alumina. Theoretically, the third and final portion of the material calcined at 1250° C. should be alpha alumina. Complete conversion of this portion of the material to alpha alumina was vertified by X-ray diffraction analysis.

A number of standard test solutions containing from 0.644 to 0.695% fluoride were prepared. Each test solution was reacted with a predetermined amount of each of the three portions of calcined alumina, a 3:1 weight ratio of alumina to theoretical aluminum fluoride being employed in each case. The reaction between the alumina and the fluoride content of each test solution was carried out at a temperature of 185° F. with vigorous agitation for a period of 4 hours. In some cases alumina trihydrate was first added to and reacted with the fluoride content of the solution before adding the calcined alumina thereto. The initial reaction between alumina trihydrate and the fluoride content of the solution was, in these cases, carried out at a temperature of 185° F. for 48 minutes using 100% of the amount of the alumina trihydrate theoretically required to react with the fluoride content of the solution. The degree of completion of the reaction was monitored throughout the 4 hour reaction period by periodically determining the fluoride concentration of the solution. On completion of the 4 hour reaction period each test solution was filtered to recover the precipitated aluminum hydroxide fluoride hydrate and the unreacted alumina. The filtered product was dried to remove free water and then calcined to drive off fixed water. Both the dried and the calcined products were analyzed by X-ray diffraction. The results of these tests are shown graphically in the single figure of the accompanying drawing.

In the drawing the percentage of the fluoride content of the test solution being treated that is converted to aluminum hydroxide fluoride hydrate is plotted against the reaction time (in hours) for each of five test runs.

Curve "A" represents the results obtained in the first test run when a test solution was first reacted with alumina trihydrate for 48 minutes and then with the prescribed amount of the alumina calcined at 700° C. (principally gamma alumina) for 4 hours.

Curve "B" represents the results obtained when a second test solution was reacted with the prescribed amount of the alumina calcined at 700° C. (principally gamma alumina) for 4 hours without prior reaction with alumina trihydrate.

Curve "C" represents the results obtained when a third test solution was reacted with the prescribed amount of the alumina calcined at 900° C. (principally data alumina) for 4 hours without prior reaction with alumina trihydrate.

Curve "D" represents the results obtained when a fourth test solution was reacted with alumina trihydrate for 48 minutes and then when the prescribed amount of the alumina calcined at 1250° C. (100% alpha alumina) for 4 hours.

Curve "E" represents the results obtained when a fifth test solution was reacted with the prescribed amount of the alumina calcined at 1250° C. (100% alpha alumina) for 4 hours with prior reaction with alumina trihydrate.

As shown in curves "A" and "B", conversion of the fluoride content of the test solution to insoluble aluminum hydroxide fluoride hydrate occurs much faster when the solution is first reacted with alumina trihydrate before reacting the solution with alumina calcined at 700° C. (gamma alumina). However, very acceptable percentage conversion rates are obtained by reacting the solution with alumina calcined at 700° C. for 4 hours without prior reaction with alumina trihydrate. Curve "C" shows that the percentage conversion of the fluoride is lower when the solution is reacted with alumina calcined at 900° C. (delta alumina) than it is when the solution is reacted with alumina calcined at 700° C. However, acceptable conversion rates are achieved nonetheless.

Curve "E" shows that when the test solution is reacted with alumina calcined at 1250° C. (pure alpha alumina) the percentage conversion of the fluoride content rose slowly to about 10% and leveled off. However, analysis of the reaction product showed no detectable aluminum hydroxide fluoride hydrate in the dried product and no detectable aluminum fluoride in the calcined product. This indicates that the fluoride was removed from the solution by the alpha alumina by some physical process and that very little, if any, chemical conversion of the fluoride to aluminum fluoride took place. Curve "D" shows that when the solution is first reacted with alumina trihydrate before "reacting" the solution was alpha alumina, a moderate degree of conversion of the fluoride content of the solution of aluminum hydroxide fluoride hydrate is obtained. However, as will be seen by comparing curve "D" with "A" and curve "E" with curve "B" the percentage conversion rate obtained when the solution is reacted with gamma alumina is much greater than when the solution is reacted with alpha alumina even when the solution is first reacted with alumina trihydrate.

These tests clearly demonstrate that the lower calcined phase forms of alumina are capable of reacting with the fluoride content of the test solution to form the intermediate product aluminum hydroxide fluoride hydrate. These tests also show that the reaction proceeds more rapidly with the lower calcined forms of aluminum. This is probably due to the specific surface area of the various alumina phase forms. The higher the degree of calcination the lower the surface area. For example, gamma alumina has 20 to 90 times the specific surface area of the alpha alumina phase form.

EXAMPLE II

A quantity of scrubber water is obtained from a scrubbing tower in which the effluent gases from an electrolytic aluminum pot line are scrubbed with water to produce a fluoride-containing aqueous solution containing from about a 0.05 to 2.0% fluoride solution. A cationic coagulant is added to the scrubber water, and the scrubber water is filtered to remove particulate matter therefrom. 1500 mililiters (ml.) of scrubber water are placed in a rection vessel and the fluoride content is adjusted to 0.218% fluoride or 3.27 grams (g.) fluoride. The fluoride-containing solution is heated to 180° F. and 14.46 g of a commercial grade electrolytic cell feed alumina having a loss of weight on ignition of 1.2% is added to the solution. The solution is stirred vigorously for 4 hours to insure completion of the reaction and to precipitate crystalline aluminum hydroxide fluoride hydrate therefrom. The precipitate is separated and recovered from the solution by filtration. The solution at this point has a fluoride content of 0.087% fluoride, indicating that about 60% of the fluoride content of the solution has been converted to aluminum hydroxide fluoride hydrate and removed with the precipitate. The fluoride remaining in solution, about 1.305g., is simply unreacted and will react if subject to subsequent exposure to the process. Chemical and X-ray diffraction analysis demonstrate that the precipitate comprises a mixture of aluminum oxide and aluminum hydroxide fluoride hydrate. The precipiate is calcined at a temperature of about 1050° F. Chemical and X-ray diffraction analysis demonstrate that the calcined product comprises essentially a mixture of about 14.9g aluminum oxide and 2.87 g aluminum fluoride.

I claim:

1. Process for the recovery of aluminum fluoride from a dilute fluoride-containing aqueous solution the fluoride content of which consists essentially of hydrofluoric acid which comprises:

introducing commercial grade (Bayer process) aluminum oxide into said solution, said aluminum oxide comprising predominantly alpha alumina admixed with a minor amount of less highly calcined forms of alumina such that the aluminum oxide has a loss of weight on ignition of from about 0.5% to about 2.5%, reacting the fluoride content of said solution with said less highly calcined forms of alumina for at least about 1 hour with stirring at an elevated temperature of between about 140° F. and the boiling point of the solution to produce a complex aluminum hydroxide fluoride hydrate ($16Al(OH,F)_3 \cdot 6H_2O$) that precipitates from said solution, recovering said aluminum hydroxide fluoride hydrate precipitate from said solution, and calcining said precipitate to produce aluminum fluoride, combined in a mixture with unreacted aluminum oxide.

2. Process according to claim 1 in which said less highly calcined forms of alumina comprise predominantly gamma aluminum and delta alumina.

3. Process according to claim 1 in which the commercial grade alumina has a loss of weight on ignition of from about 1.0% to 2.0%.

4. Process according to claim 1 in which the aqueous solution contains at least about 0.02% fluoride.

5. Process according to claim 1 in which the fluoride-containing aqueous solution is scrubber water containing from about 0.05 to 2.0% fluoride obtained by scrubbing with water the effluent gases from an aluminum electrolytic cell.

6. Process according to claim 1 in which the aluminum oxide used to precipitate the aluminum hydroxide fluoride hydrate from the solution is added in an amount of from one to 20 weight portions of aluminum oxide per one weight portion of theoretical aluminum fluoride that can be produced from the fluoride present in the solution.

7. Process according to claim 6 in which the weight ratio of said added aluminum oxide to said theoretical aluminum fluoride is between about 1:1 and 5:1.

8. Process according to claim 1 in which the precipitation of the aluminum hydroxide fluoride hydrate product is carried out with agitation of the solution for a period from about 1 hour to 20 hours.

9. Process according to claim 8 in which the precipitation of the aluminum hydroxide fluoride hydrate product is carried out for a period of about 4 hours.

* * * * *